United States Patent [19]

Hempelmann et al.

[11] Patent Number: 4,884,851
[45] Date of Patent: Dec. 5, 1989

[54] WHEEL TRIM RETENTION

[75] Inventors: Heinrich J. Hempelmann; Eugene M. Pruss, both of Livonia, Mich.

[73] Assignee: NI Industries, Inc., Novi, Mich.

[21] Appl. No.: 149,646

[22] Filed: Jan. 28, 1988

[51] Int. Cl.⁴ .................................................. B60B 7/00
[52] U.S. Cl. .............................. 301/37 PB; 301/37 P; 301/37 C
[58] Field of Search ................ 301/37 R, 37 P, 37 T, 301/37 C, 37 CD, 37 TP, 37 PB

[56] References Cited

U.S. PATENT DOCUMENTS

| | | | |
|---|---|---|---|
| 2,917,341 | 12/1959 | Lyon, Jr. | 301/37 PB |
| 3,876,257 | 4/1975 | Buerger | 301/37 C X |
| 4,131,322 | 12/1978 | Beiscot et al. | 301/37 PB |
| 4,328,997 | 5/1982 | Connell | 301/37 P |
| 4,427,238 | 1/1984 | Connell | 301/37 P |
| 4,438,979 | 3/1984 | Renz et al. | 301/37 P X |
| 4,447,092 | 8/1984 | Beisch | 301/37 P |
| 4,523,789 | 1/1985 | Schwarz | 301/37 P |
| 4,603,914 | 8/1986 | Brown, et al. | 301/37 P |
| 4,679,861 | 7/1987 | Narita et al. | 301/37 CD X |
| 4,738,490 | 4/1988 | Loren | 301/37 TP |

FOREIGN PATENT DOCUMENTS

| | | | |
|---|---|---|---|
| 0149935 | 7/1985 | European Pat. Off. | 301/37 P |
| 0187228 | 7/1986 | European Pat. Off. | 301/37 CD |

*Primary Examiner*—Russell D. Stormer
*Attorney, Agent, or Firm*—Harness, Dickey & Pierce

[57] ABSTRACT

A wheel trim removeable engaging a wheel rim including an annular fiberglass band having a first end disposed in a groove of the wheel trim and a second end extending axially inwardly therefrom toward the wheel rim and including a hook portion for removeably engaging the safety groove of the rim flange to releasably retain the wheel trim on the wheel rim.

13 Claims, 3 Drawing Sheets

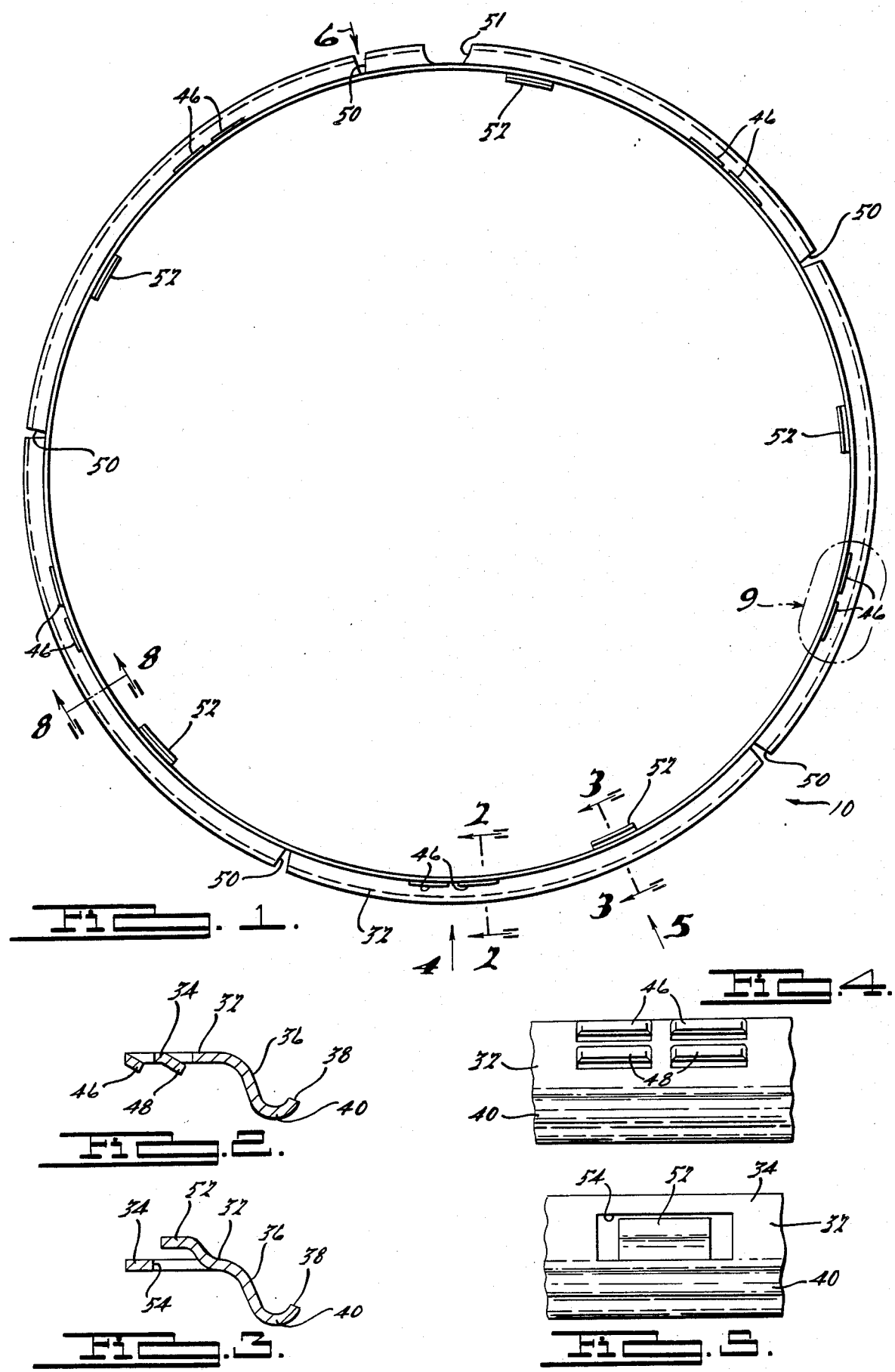

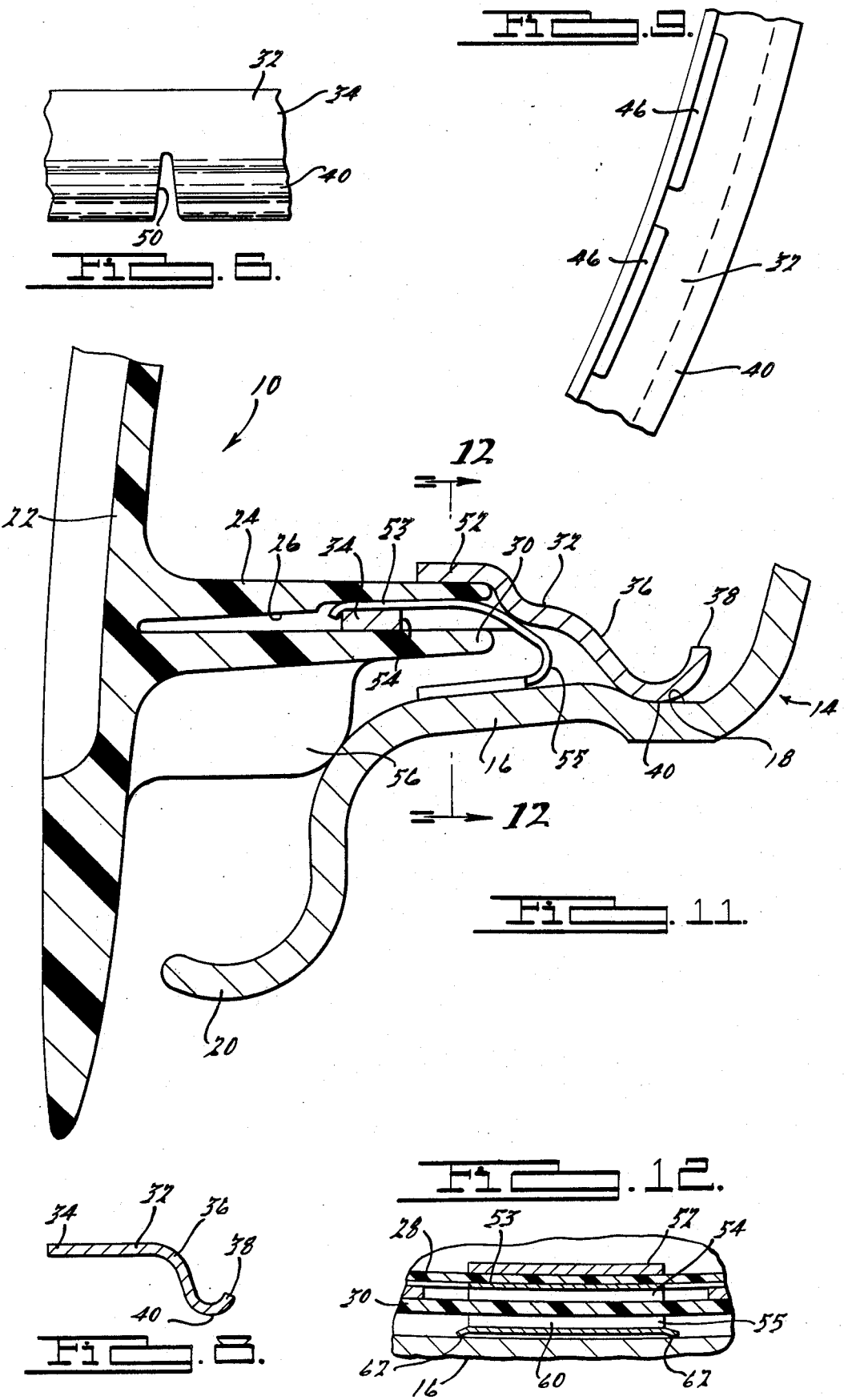

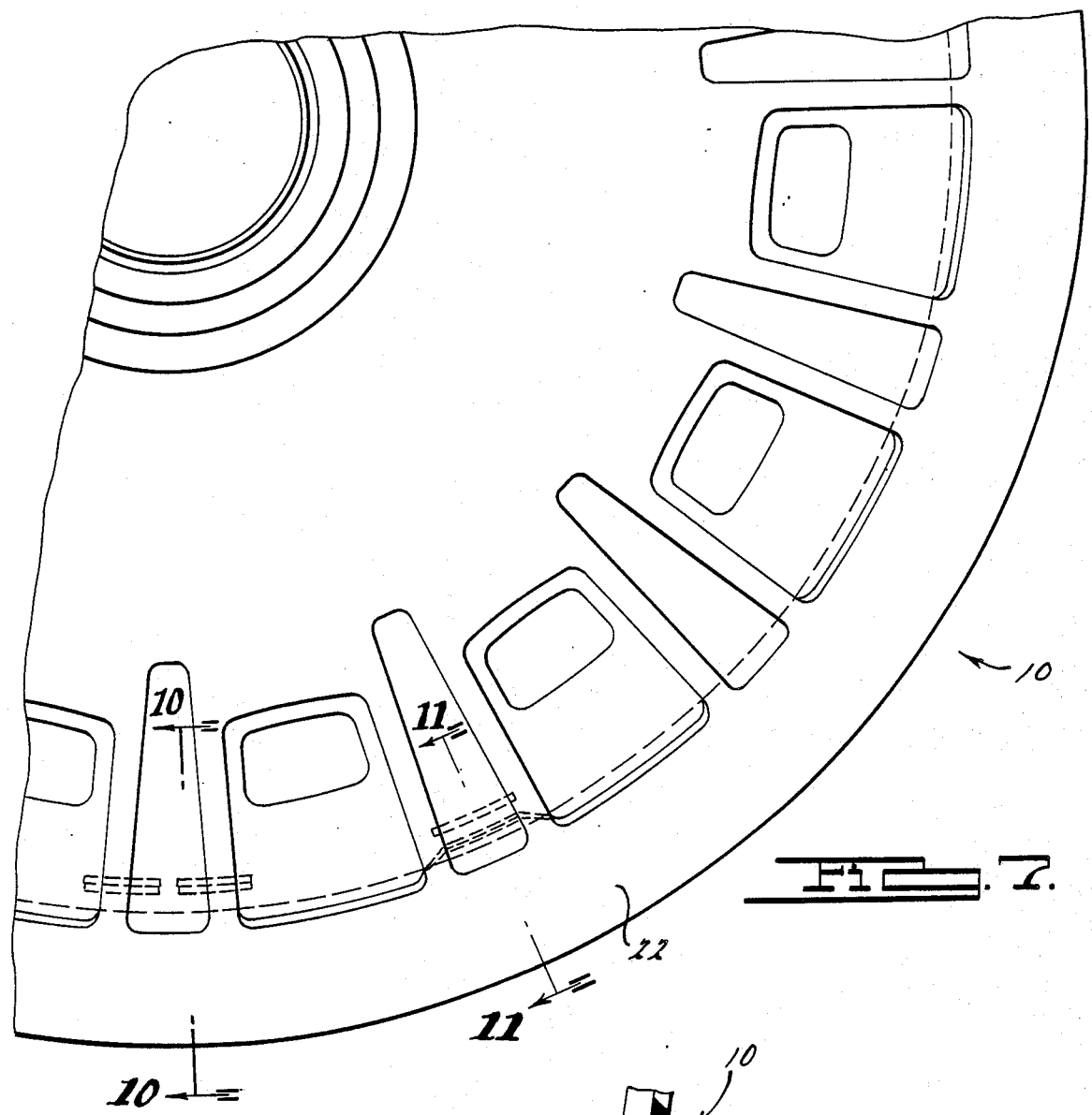
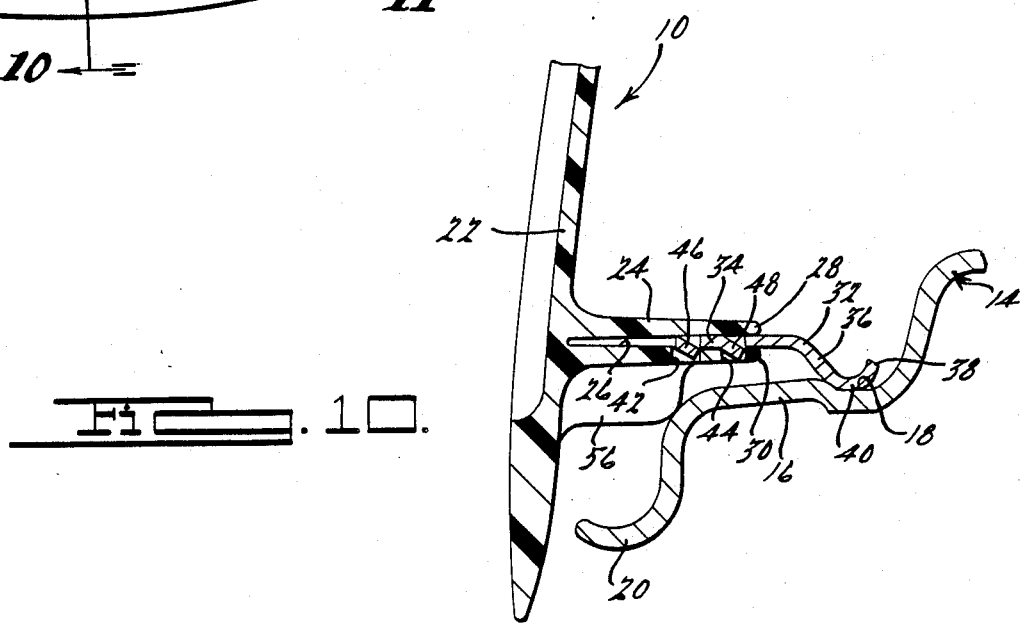

much WHEEL TRIM RETENTION

BACKGROUND OF THE INVENTION

The present invention relates to vehicle wheel trim, and more particularly, to improved retention means for securing wheel trim to a vehicle wheel.

Wheel covers are a popular form of wheel trim which are used to decorate vehicle wheels. Although there are numerous types of retention means for securing a wheel cover to a vehicle wheel, the industry is constantly trying to devise simpler and less expensive ways to accomplish the job in a reliable and safe manner. The present invention seeks to achieve this goal, and at the same time provide a retention which is immune to corrosion and which will minimize any scratching of the wheel during mounting and unmounting of the trim.

Other advantages of the present invention will be readily appreciated when it becomes better understood by reference to the following detailed description and accompanying drawings.

BRIEF DESCRIPTION OF THE DRAWINGS

FIG. 1 is a rear elevational view of a wheel trim retention band embodying the principles of the present invention;

FIG. 2 is a sectional view taken along line 2—2 of FIG. 1;

FIG. 3 is a sectional view taken along ling 3—3 of FIG. 1;

FIG. 4 is a fragmentary side elevational view of the retention band looking in the direction of arrow 4 in FIG. 1;

FIG. 5 is a fragmentary side elevational view of the retention band looking in the direction of arrow 5 in FIG. 1;

FIG. 6 is a fragmentary front elevational view looking in the direction of arrow 6 in FIG. 1;

FIG. 7 is a fragmentary front elevational view of a portion of a wheel trim embodying the principles of the present invention;

FIG. 8 is a sectional view taken along line 8—8 of FIG. 1;

FIG. 9 is an enlarged view of the portion of the retention band indicated by circle 9 in FIG. 1;

FIG. 10 is a sectional view taken along line 10—10 of FIG. 7;

FIG. 11 is a sectional view taken along line 11—11 of FIG. 7; and

FIG. 12 is a sectional view taken along line 12—12 in FIG. 11.

DETAILED DESCRIPTION OF THE PREFERRED EMBODIMENT

There is illustrated a wheel cover or trim 10 adapted for removable engagement with a conventional wheel rim 14, which includes an annular axial flange portion 16, an annular inner safety groove 18 and an outer annular curl or flange 20. Wheel rim 14 is of a type commonly found in the art for attachment to an automotive vehicle or the like.

Wheel trim 10 includes a decorative cover face 22 and a continuous annular axial flange 24 connected to the cover face 22 near the periphery thereof and extending axially inwardly toward wheel rim 14. Axial flange 24 includes a continuous annular groove or slot 26 therein. Groove 26 separates axial flange 24 in two parts comprising an inner finger 28 and an outer finger 30, both extending axially inwardly toward wheel rim 14.

One of the unique features of the present invention is the use of a retention band 32 preferably made of one-piece pressure molded fiberglass. Band 32 has a first end 34 disposed in groove 26 and a second end 36 extending axially inwardly toward wheel rim 14. End 36 includes a terminal hook portion 38 having an arcuate surface 40 extending radially outwardly to engage or nest in safety groove 18 on rim 14. Hook portion 38 acts as a retention means for removably attaching band 32 to safety groove 18 to releasably retain wheel trim 10 on rim 14.

Axial flange 24 includes a first row of circumferentially spaced first apertures 42 formed in finger 30 and communicating with groove 24. Axial flange 24 also includes a second parallel row of circumferentially spaced second apertures 44 which are axially spaced from first apertures 42 and also communicate with groove 26. End 34 of band 32 includes corresponding first and second rows of circumferentially spaced protrusions 46 and 48 extending axially inwardly and radially outwardly. Protrusions 46 and 48 are disposed in apertures 42 and 44 in axial flange 24, respectively, to retain band 32 in assembled relationship. Fingers 28 and 30 and protrusions 46 and 48 flex sufficiently to allow band 32 to be snapped into place, as best shown in FIG. 10.

Annular band 32 also includes a plurality of circumferentially spaced notches 50 formed in the radial periphery of end 36, as best illustrated in FIGS. 1 and 6. Notches 50 permit band 32 to flex and permit hook portion 38 of band 32 to engage safety groove 18 of wheel rim 14 during assembly. Annular band 32 also includes an arcuate notch 51 to allow the valve stem (not shown) of the tire to protrude through wheel trim 10.

As best illustrated in FIGS. 3 and 5, annular band 32 further includes a plurality of circumferentially spaced raised tabs 52 extending radially inwardly and axially outwardly from the middle of band 32. The formation of each raised tab 52 creates an aperture 54. Each tab 52 is disposed in an assembled correlation partially wrapped about one end of finger 28 of axial flange 24, and serves to strengthen the overall assembly in the radial direction and assist in limiting relative axial movement of the band 32 toward wheel trim 10 during mounting of the trim to the wheel.

Wheel trim 10 further includes an anti-rotation clip 55, as best illustrated in FIGS. 11 and 12. Each anti-rotation clip 55 has an integral inner tang 53 which passes through aperture 54 in band 32 and is pinched between band 32 and finger 24, to thereby retain clip 55 in an assembled relationship. Opposite tang 53, clip 55 has an integral outer retention finger 60 having integral rim-engaging teeth 62 along each edge thereof. Teeth 62 bitingly engage rim 16 to inhibit rotation of wheel trim 10 with respect to the wheel rim 14.

Cover face 22 includes a plurality of projections 56 extending radially outwardly and axially inwardly toward wheel rim 14. Projections 56 operate as a stop or locating means for locating cover face 22 axially a predetermined distance relative to wheel rim 14 when hook portion 40 is disposed within safety groove 18.

In assembly to a wheel, wheel trim 10 is positioned adjacent wheel rim 14 in alignment therewith and then pushed axially inwardly until hook portion 40 snaps into safety groove 18. The overall outside diameter of hook portion 40 is preferably normally slightly larger than the inside diameter of safety groove 18, thus causing band 32 to flex radially while being under compression in a circumferential direction, thereby ensuring continued retention under all normal conditions. Removal of wheel trim 10 from wheel rim 14 may be effected in the usual manner.

The present invention has been described in an illustrative manner, and it is to be understood that the terminology which has been used is intended to be in the nature of description rather than of limitation. Obviously, modifications and variations of the present invention are possible in light of the above teachings. It is therefore to be understood that within the scope of the appended claims, the present invention may be practiced otherwise than as specifically described.

What is claimed is:

1. A wheel trim adapted for removable engagement with a wheel rim having an annular generally axially disposed flange portion and an annular safety groove, said wheel trim comprising:
   trim means defining an outwardly facing ornamental surface;
   an axial flange connected to said trim means and normally extending axially inwardly toward the wheel rim;
   groove means defining an annular groove in the axially inner end of said axial flange;
   a continuous retention band having a first end disposed in said groove means and a second end normally extending axially inwardly toward the wheel rim, said band including a plurality of circumferentially spaced tabs normally extending radially inwardly and axially outwardly into radially overlying relationship with a radially inwardly facing surface of said axial flange, each said tab being disposed partially about said axially inner end of said axial flange to strengthen the assembly; and
   retaining means on said retention band normally removably engaging said safety groove to releasably retain said wheel trim on said wheel rim.

2. A wheel trim as set forth in claim 1 further comprising means defining a plurality of circumferentially spaced apertures in said axial flange communicating with said groove, and a plurality of circumferentially spaced protrusions extending radially from said first end of said retention band, said protrusions being lockingly disposed in said apertures.

3. A wheel trim as set forth in claim 1 further comprising flexing means for allowing said band means to flex and to permit said retaining means of said retention band to move into said safety groove of the wheel rim.

4. A wheel trim as set forth in claim 3 wherein said flexing means comprises a plurality of circumferentially spaced notches in the periphery of said second end of said retention band.

5. A wheel trim as set forth in claim 1 wherein said retaining means includes a hook portion having an arcuate portion extending radially outwardly to engage and nest in said safety groove of the wheel rim.

6. A wheel trim as set forth in claim 1 characterized by said band means being made of fiberglass.

7. A wheel trim as set forth in claim 1 further comprising at least one anti-rotation clip having a leg received within said groove, said leg and a wall of said flange defining said groove being captured between said tabs and said first end of said band to retain said clip in assembled relationship with said trim.

8. A wheel trim as set forth in claim 1 wherein said retention band is formed of a non-corroding non-metallic material.

9. A wheel trim as set forth in claim 1 wherein said retaining means comprise a circumferentially elongated radially inwardly opening hook portion having a radially outwardly projecting arcuate portion receivable in said safety groove so as to cooperate therewith to retain said wheel trim in assembled relationship with said vehicle wheel.

10. A wheel trim as set forth in claim 9 wherein said arcuate portion is also adapted to cooperate with said axially disposed wheel flange to facilitate radially inward deflection of said continuous retention band during assembly of said trim to said vehicle wheel.

11. A wheel trim as set forth in claim 10 further comprising flexing means for enabling said band to deflect during assembly of said trim to said vehicle wheel.

12. A wheel trim adapted for removable engagement with a wheel rim having an anular generally axially disposed flange portion and an annular safety groove, said wheel trim comprising:
   trim means defining an outwardly facing ornamental surface;
   an axial flange connected to said trim means and normally extending axially inwardly toward the wheel rim;
   groove means defining an annular groove in said axial flange;
   a continuous retention band having a first end disposed in said groove means and a second end normally extending axially inwardly toward the wheel rim;
   retaining means on said retention band normally removably engaging said safety groove to releasably retain said wheel trim on said wheel rim; and
   a plurality of anti-rotation clips mounted on said axial flange and having at least one finger engaging the wheel to restrict relative rotation of said wheel and trim,
   each of said clips having a leg which is pinched between said retention band and the side wall of said groove to anchor said clip to said trim.

13. A wheel trim adapted for removable engagement with a wheel rim having an annular generally axially disposed flange portion and an annular safety groove, said wheel trim comprising:
   trim means defining an outwardly facing ornamental surface;
   an axial flange connected to said trim means and normally extending axially inwardly toward the wheel rim;
   groove means defining an annular groove in said axial flange;
   a continuous retention band having a first end disposed in said groove means and a second end normally extending axially inwardly toward the wheel rim;
   retaining means on said retention band, said retaining means including a generally radially outwardly projecting and radially inwardly opening arcuate hook portion adapted to normally removably engage said safety groove to releasably retain said wheel trim on said wheel rim; and
   a plurality of anti-rotation clips mounted on said axial flange,
   each of said clips being generally U-shaped in configuration and having two legs extending from a bight portion, one of said legs being pinched between said retention band and the side wall of said groove and the other of said legs having at least one finger engaging the wheel to restrict relative rotation of said wheel and trim.

* * * * *

UNITED STATES PATENT AND TRADEMARK OFFICE
CERTIFICATE OF CORRECTION

PATENT NO. : 4,884,851

DATED : December 5, 1989

INVENTOR(S) : Heinrich J. Hempelmann and Eugene M. Pruss

It is certified that error appears in the above-identified patent and that said Letters Patent is hereby corrected as shown below:

On the title page,

Item [56] the 4,131,322 reference to "Beiscot et al" should read -- Beisch et al --.

Abstract, line 1, "removeable" should be -- removably --.

Abstract, line 5, "removeably" should be -- removably --.

Column 1, line 30, "ling" should be -- line --.

Column 4, line 16, Claim 12, "anular" should be -- annular --.

Signed and Sealed this

Twenty-ninth Day of January, 1991

*Attest:*

HARRY F. MANBECK, JR.

*Attesting Officer*     *Commissioner of Patents and Trademarks*